US007872765B2

(12) United States Patent
Liu

(10) Patent No.: US 7,872,765 B2
(45) Date of Patent: Jan. 18, 2011

(54) NON-POSTSCRIPT PRINTER DESCRIPTION FILE GENERATING TOOL

(75) Inventor: Yue Liu, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1366 days.

(21) Appl. No.: 11/361,138

(22) Filed: Feb. 23, 2006

(65) Prior Publication Data

US 2007/0195352 A1 Aug. 23, 2007

(51) Int. Cl.
*G06F 3/12* (2006.01)
(52) U.S. Cl. ..................................... 358/1.13; 358/1.15
(58) Field of Classification Search ................ 358/1.13, 358/1.15, 1.14, 1.16; 715/234, 239, 243; 710/8–18
See application file for complete search history.

(56) References Cited

U.S. PATENT DOCUMENTS

| 5,713,032 | A  | * | 1/1998  | Spencer ...................... 715/209 |
| 5,715,379 | A  | * | 2/1998  | Pavlovic et al. ............. 358/1.13 |
| 5,857,064 | A  | * | 1/1999  | deSilva ...................... 358/1.13 |
| 6,476,927 | B1 | * | 11/2002 | Schwarz, Jr. ............... 358/1.15 |
| 6,633,400 | B1 | * | 10/2003 | Sasaki et al. ............... 358/1.15 |
| 7,016,865 | B1 | * | 3/2006  | Weber et al. ................... 705/26 |
| 7,054,015 | B1 | * | 5/2006  | Ganji ......................... 358/1.13 |
| 7,213,070 | B2 | * | 5/2007  | Chalon ........................ 709/226 |
| 7,256,901 | B2 | * | 8/2007  | Ferlitsch .................... 358/1.13 |
| 7,375,837 | B2 | * | 5/2008  | Ferlitsch .................... 358/1.13 |
| 7,535,585 | B2 | * | 5/2009  | Nakao et al. ............... 358/1.13 |
| 2001/0044868 | A1 | * | 11/2001 | Roztocil et al. ............. 710/129 |
| 2002/0171856 | A1 | * | 11/2002 | Ackerman et al. ......... 358/1.13 |
| 2003/0090694 | A1 | * | 5/2003  | Kennedy et al. ........... 358/1.13 |
| 2004/0190032 | A1 | * | 9/2004  | Ferlitsch .................... 358/1.13 |
| 2004/0263900 | A1 | * | 12/2004 | Nguyen et al. ............. 358/1.15 |
| 2005/0225789 | A1 | * | 10/2005 | Ferlitsch .................... 358/1.13 |
| 2006/0055958 | A1 | * | 3/2006  | Kim et al. ................... 358/1.14 |
| 2007/0091356 | A1 | * | 4/2007  | Kremer ....................... 358/1.15 |
| 2007/0291300 | A1 | * | 12/2007 | Lefebvre et al. ........... 358/1.15 |

FOREIGN PATENT DOCUMENTS

WO WO 01/02950 A2 1/2001

OTHER PUBLICATIONS

Brian Ward, "How Linux Works", May 1, 2004, Published by William Pollock, p. 181-199.*
European Patent Office, "Communication," European Search Report, Apr. 7, 2010, 10 pages.
Adobe Systems, Inc., "PostScript Printer Description File Format Specification 4.3—Chapters 1 & 2," Feb. 9, 1996, XP-002158174, 18 pages.

* cited by examiner

*Primary Examiner*—Twyler L Haskins
*Assistant Examiner*—Dennis Dicker
(74) *Attorney, Agent, or Firm*—Hickman Palermo Truong & Becker LLP

(57) ABSTRACT

A method for automatically generating a custom printer description file is disclosed. The custom printer description file enables a computer's printing system to insert, into a print data stream, commands (e.g., PCL, PJL, JCL, JDF, or PJTF commands) that cause a non-Postscript-enabled printing device (e.g., a non-Postscript printer) to perform operations in accordance with a user's specified desires. The custom printer description file is automatically generated based on an existing PPD file, which already indicates the features that the user's printing device supports. According to one aspect, an automated tool reads both an existing PPD file and translation data. Using the translation data, the automated tool generates a custom printer description file that contains appropriate non-Postscript commands for each feature/option combination that the printing device supports.

31 Claims, 5 Drawing Sheets

NON-POSTSCRIPT PRINTER DESCRIPTION FILE GENERATING TOOL

FIELD OF THE INVENTION

The invention relates to printer drivers, and more specifically, to a technique and automated tool for generating a custom printer description file based on a postscript printer description file.

BACKGROUND OF THE INVENTION

Printing devices, such as printers, copy machines, and multi-function peripherals (MFPs) such as the Ricoh Aficio Color 6513 system, may or may not be equipped with the capability to understand Postscript commands. For example, a vendor might give its customers the option of purchasing a printing device with or without Postscript capability installed. Typically, a printing device with Postscript capability installed is considerably more expensive than the same printing device without Postscript capability installed. For this reason, many customers opt to purchase a printing device without Postscript capability installed.

This is typically not a problem when the customers are printing from applications that execute on Microsoft Windows operating systems. Typically, Windows printer drivers generate a print data stream that contains non-Postscript commands, such as Printer Command Language (PCL) commands or Printer Job Language (PJL) commands. Most commercially available printing devices are designed to understand PCL and PJL. Therefore, a printing device on which Postscript capability has not been installed (a "non-Postscript-enabled" printing device) usually does not have any problems understanding the commands in a print data stream generating by a Windows printer driver, because the commands are not Postscript commands.

An increasing number of people are migrating from Windows to other operating systems such as UNIX and Linux. Many of these people have already purchased non-Postscript-enabled printing devices that worked in conjunction with their Windows-configured computers. Unfortunately for these people, most implementations of UNIX and Linux only provide Postscript printer drivers. These printer drivers only generate Postscript commands, which a non-Postscript-enabled printing device is unable to understand or process.

Typically, a printer driver for a UNIX or Linux system comprises a Postscript Printer Description (PPD) file that is specifically designed for the printing device to which the system will be sending print data streams. The PPD file indicates, in a standard way, the features that the corresponding printing device supports. For example, if a printing device supports duplex, stapling, and punching features, then the PPD file for that printing device indicates this fact.

For some features, a user may choose one of several options when printing a document. For example the options that may be selected in conjunction with the duplex feature might be "off," "short edge," and "long edge." For each option, the PPD file may indicate a corresponding Postscript command that should be sent to the printing device in order to cause the printing device to perform operations that correspond to that option. By consulting the PPD file, a computer's printing system can determine which Postscript commands to insert into a print data stream in order to instruct the printing device to perform operations in accordance with a user's selected options.

Existing PPD files do not solve the problems faced by owners of non-Postscript-enabled printing devices, because existing PPD files only enable Postscript commands to be inserted into a print data stream. Furthermore, these owners typically are not savvy enough in the art of printer drivers to modify their existing Postscript printer drivers to work in conjunction with their non-Postscript-enabled printing devices.

Vendors of non-Postscript-enabled printing devices could conceivably create UNIX and/or Linux printer drivers that produced commands that their non-Postscript-enabled printing devices could understand. However, such vendors are unlikely to do so in many circumstances because it often does not align with their economic interests.

Based on the foregoing, there is a need for a tool that automatically generates a printer driver that allows a user of a Postscript-oriented operating system, such as UNIX or Linux, to print to a non-Postscript-enabled printing device.

SUMMARY OF THE INVENTION

A method for automatically generating a custom printer description file is disclosed. The custom printer description file enables a computer's printing system to insert, into a print data stream, commands (e.g., PCL, PJL, Job Definition Format (JDF), Portable Job Ticket Format (PJTF), or Job Control Language (JCL) commands) that cause a non-Postscript-enabled printing device (e.g., a non-Postscript printer) to perform operations in accordance with a user's specified desires. The custom printer description file is automatically generated based on an existing PPD file, which already indicates the features that the user's printing device supports. According to one aspect, an automated tool reads both an existing PPD file and translation data. Using the translation data, the automated tool generates a custom printer description file that contains appropriate non-Postscript commands for each feature/option combination that the printing device supports.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

According to one embodiment of the invention, an automated tool, which is implemented as a computer program, reads an existing PPD file and translation data. The PPD file indicates features that a printing device supports, as well as the possible options that may be selected for each of those features. The translation data indicates, for each feature/option combination, one or more corresponding non-Postscript commands (e.g., PCL, PJL, JCL, JDF, or PJTF commands) that ought to be inserted into a print data stream in order to cause a non-Postscript-enabled printing device to perform operations that correspond to the feature/option combination. In one embodiment of the invention, for each Postscript command that appears in a PPD file, the automated tool replaces that Postscript command with one or more corresponding non-Postscript commands that serve the same or a similar purpose, as indicated in the translation data. Thus, the automated tool generates a custom printer description file that contains non-Postscript commands.

When a user of a Postscript-oriented operating system sends print data to the operating system's printing subsystem, the printing subsystem consults the custom printer description file and inserts, into the print data stream that will be sent to the printing device, non-Postscript commands that correspond to the user's selected options.

Example System

Figure 1:
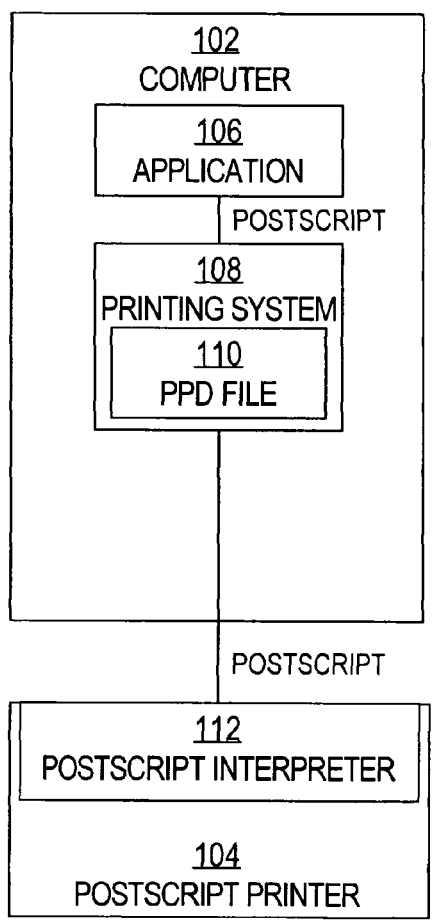
FIG. 1 is a block diagram that depicts an example of a system that uses a PPD file to print to a Postscript printer.

FIG. 1 is a block diagram that depicts an example of a system that uses a PPD file to print to a Postscript printer. The example is shown in contrast to another system that is described in relation to FIG. 2 below.

The system of FIG. 1 comprises a computer 102 and a Postscript printer 104. On computer 102, an application 106 executes. In this case, application 106 is a program that sends a Postscript print data stream to printing system 108 of computer 102. Printing system 108 comprises a Postscript Printer Definition (PPD) file 110. PPD file 110 describes Postscript commands that ought to be sent toward Postscript printer 104 in order to make Postscript printer 104 perform operations in accordance with a user's selected printing options (e.g., duplex options). Printing system 108 generates such Postscript commands and inserts them into the print data stream that is sent toward Postscript printer 104.

In this case, Postscript printer 104 comprises a Postscript interpreter 112. Because Postscript printer 104 comprises Postscript interpreter 112, Postscript printer 104 is a "Postscript-enabled" printing device. Postscript interpreter 112 allows Postscript printer 104 to understand the Postscript commands that printing system 108 inserted into the print data stream. As a result, Postscript printer 104 is able to print a document represented within the print data stream in accordance with the user's selected printing options.

Figure 2:
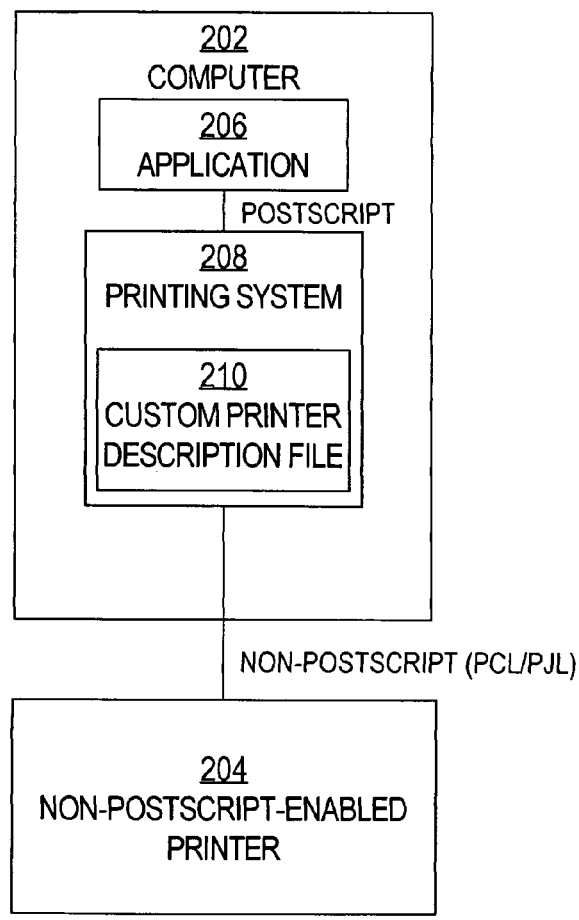
FIG. 2 is a block diagram that depicts an example of a system that uses an automatically generated custom printer description file to print to a non-Postscript-enabled printer, according to an embodiment of the invention.

The system shown in FIG. 1 may be contrasted with the system shown in FIG. 2. FIG. 2 is a block diagram that depicts an example of a system that uses an automatically generated custom printer description file to print to a non-Postscript-enabled printer, according to an embodiment of the invention.

The system of FIG. 2 comprises a computer 202 and a non-Postscript-enabled printer 204. In this case, printer 204 does not comprise Postscript interpreter 112 as printer 104 did in FIG. 1. As a result, printer 204 is unable to understand or process Postscript commands. Thus, unlike printer 104 of FIG. 1, printer 204 is a "non-Postscript-enabled printer."

An application 206 executes on computer 202. Again, in this case, application 206 is a program that sends a Postscript print data stream to a printing system 208 of computer 202. For example, application 206 may be an application executing on a Linux or UNIX system; such applications typically send print data streams that comprise Postscript commands.

Unlike printing system 108 of FIG. 1, printing system 208 comprises a custom printer description file 210 instead of PPD file 110. Instead of Postscript commands, custom printer description file 210 describes non-Postscript commands (e.g., PCL, PJL, JCL, JDF, or PJTF commands) that ought to be sent toward printer 204 in order to make printer 204 perform operations in accordance with a user's selected printing options (e.g., duplex options). When custom printer description file 210 is generated, non-Postscript commands that printer 204 can understand and process are selected for inclusion within custom printer description file 210. The generation of custom printer description file 210 is discussed in further detail below. Printing system 208 generates non-Postscript commands in accordance with custom printer description file 210 and inserts those commands into the print data stream that is sent toward printer 204.

Because the print data stream that printing system 208 sends toward printer 204 comprises non-Postscript commands that printer 204 is designed to understand and process, printer 204 is able to print a document represented within the print data stream in accordance with the user's selected printing options. This is so even though the print data stream that application 206 generated originally contained Postscript commands.

Example Custom Printer Description File Generation Tool

Figure 3:
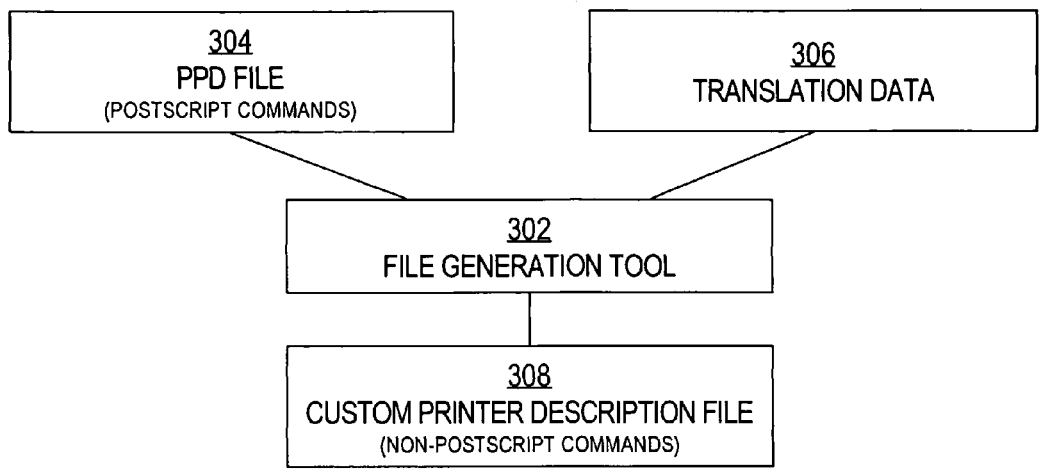
FIG. 3 is a block diagram that depicts an example of a tool that automatically generates a custom printer description file based on a PPD file and translation data, according to an embodiment of the invention.

FIG. 3 is a block diagram that depicts an example of a tool that automatically generates a custom printer description file based on a PPD file and translation data, according to an embodiment of the invention.

Shown within FIG. 3 are file generation tool 302, PPD file 304, translation data 306, and custom printer description file 308. In one embodiment of the invention, file generation tool 302 is a computer program that reads PPD file 304. PPD file 304 is specific to a printing device, and indicates the features (e.g., duplex, punching, stapling, etc.) that the printing device provides. For each such feature, PPD file 304 additionally indicates the possible options (e.g., on, off, etc.) that a user may select for that feature, and the Postscript commands that are needed to cause a Postscript printer to perform operations in accordance with each such option. An example PPD file is described in greater detail below.

File generation tool 302 also reads translation data 306. In one embodiment of the invention, translation data 306 comprises a mapping between feature/option pairs (e.g., duplex/off, duplex/long edge, duplex/short edge, etc.) and the non-Postscript commands that are needed to cause a non-Postscript-enabled printer to perform operations in accordance with those feature/option pairs. For each possible Postscript command that may be indicated in PPD file 304, translation data 306 comprises one or more corresponding non-Postscript commands (e.g., PCL, PJL, JCL, JDF, or PJTF commands) that cause a printing device to perform equivalent operations. In one embodiment of the invention, translation data 306 is implemented as a "lookup table." An example of such a lookup table is described in greater detail below.

In one embodiment of the invention, based on the information contained in PPD file 304 and translation data 306, file generation tool 302 automatically generates custom printer description file 308. Generally, file generation tool 302 generates custom printer description file 308 by replacing each instance of a Postscript command in PPD file 304 with that Postscript command's corresponding non-Postscript command(s) as indicated in translation data 306. Thus, in one embodiment of the invention, custom printer description file 308 is a non-Postscript version of PPD file 304. Custom printer description file 308 comprises non-Postscript commands that allow a non-Postscript-enabled printer to perform operations in accordance with the printing options that a user has specified.

A different file generation tool may be constructed for each different non-Postscript language desired. For example, a first file generation tool that specifically generates commands in PCL may be constructed, and a second file generation tool that specifically generates commands in PDF may be constructed.

Example PPD and Custom Printer Description Files

Table 1 shows an example of a portion of a PPD file, such as might be contained in PPD file 304.

TABLE 1

EXAMPLE PPD FILE PORTION

*OpenUI *Duplex/Duplex: PickOne
*OrderDependency: 50 Anysetup *Duplex
*Default Duplex: None
*Duplex None/Off: "<</Duplex false>>setpagedevice"
*Duplex DuplexTumble/Short Edge: "<</Duplex true /Tumble true>>setpagedevice"
*Duplex DuplexNoTumble/LongEdge: "<</Duplex true /Tumble false>>setpagedevice"
*CloseUI: *Duplex In the PPD file portion of Table 1, there is one feature, "Duplex," which can assume any one of three different options: "None/Off," "DuplexTumble/Short Edge," and "DuplexNoTumble/Long Edge." For each of these options, the PPD file portion specifies a separate Postscript command that is needed to cause a Postscript printer to perform operations in accordance with that option. For the "None/Off" option, the corresponding Postscript command is "<</Duplex false>>setpagedevice." For the "DuplexTumble/Short Edge" option, the corresponding Postscript command is "<</Duplex true/Tumble true>>setpagedevice." For the "DuplexNoTumble/Long Edge" option, the corresponding Postscript command is "<</Duplex true/Tumble false>>setpagedevice." Although these Postscript commands can be understood by a Postscript printer, a non-Postscript-enabled printer cannot understand or process these Postscript commands.

Figure 4:
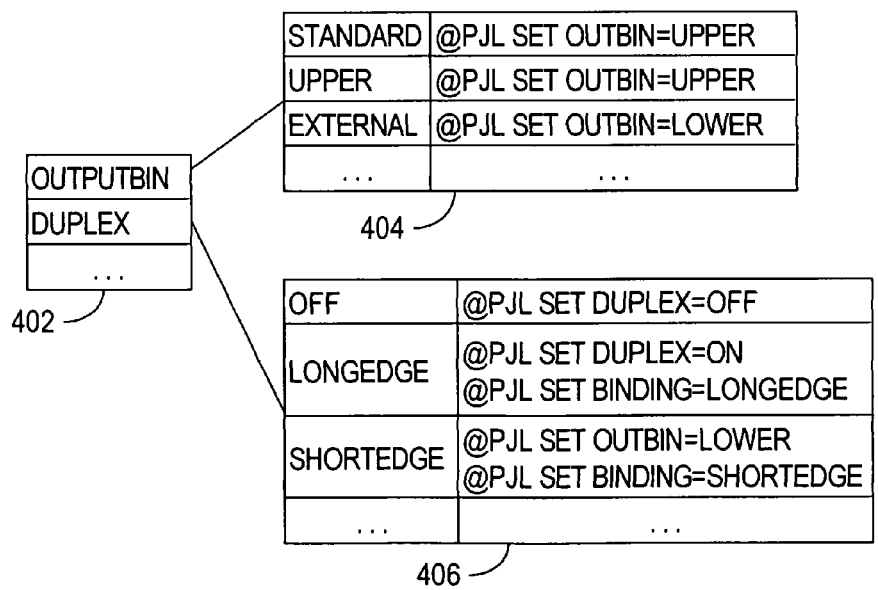
FIG. 4 is a block diagram that depicts an example of a lookup table that comprises mappings between feature/option pairs and corresponding non-Postscript commands, according to an embodiment of the invention.

FIG. 4 is a block diagram that depicts an example of a lookup table that comprises mappings between feature/option pairs and corresponding non-Postscript commands, according to an embodiment of the invention. Such a lookup table may constitute translation data 306 of FIG. 3, for example. Different lookup tables may be constructed for different printer models. For example, a lookup table constructed for a Ricoh printer might differ from a lookup table constructed for a printer manufactured by some other vendor.

In one embodiment of the invention, lookup table comprises a list of possible features 402 that a printing device might provide. In the lookup table shown, feature list 402 comprises entries for at least two features: "OutputBin" and "Duplex." For each feature, lookup table comprises a separate associated list of options and non-Postscript commands that correspond to those options. For example, in the lookup table of FIG. 4, the "OutputBin" entry is associated with option list 404 and the "Duplex" entry is associated with option list 406.

Option list 404 comprises entries for at least three options: "Standard," "Upper," and "External." For each option, option list 404 indicates a corresponding non-Postscript command—in this example, a PJL command. For the "Standard" option, the corresponding non-Postscript command is "@PJL SET OUTBIN=UPPER." For the "Upper" option, the corresponding non-Postscript command is "@PJL SET OUTBIN=UPPER" also. For the "External" option, the corresponding non-Postscript command is "@PJL SET OUTBIN=LOWER."

Option list 406 also comprises entries for at least three options: "Off," "LongEdge," and "ShortEdge." For each option, option list 406 indicates one or more corresponding non-Postscript commands-again, in this example, PJL commands. For the "Off" option, the corresponding non-Postscript command is "@PJL SET DUPLEX=OFF." For the "LongEdge" option, the corresponding non-Postscript commands are "@PJL SET DUPLEX=ON" and "@PJL SET BINDING=LONGEDGE." For the "ShortEdge" option, the corresponding non-Postscript commands is "@PJL SET DUPLEX=ON" and "@PJL SET BINDING=SHORTEDGE."

Based on the PPD file portion shown in Table 1 and the lookup table shown in FIG. 4, a file generation tool, such as file generation tool 302 of FIG. 3, automatically generates a corresponding custom printer description file, such as custom printer description file 308 of FIG. 3. For example, if the custom printer description file is generated based on the Postscript commands shown in Table 1 and the lookup table shown in FIG. 4, the custom printer description file might contain non-Postscript commands such as are shown in Table 2 below.

TABLE 2

EXAMPLE CUSTOM PRINTER DESCRIPTION FILE PORTION

*OpenUI *Duplex/Duplex: PickOne
*FoormaticRIPOptionDuplex: enum JCL A
*OrderDependency: 50 Anysetup *Duplex
*Default Duplex: None
*Duplex None/Off: "%%FoomaticRIPOptionSetting: Duplex=None"
*FoomaticRIPOptionSetting Duplex=None: "SET DUPLEX=OFF"
*Duplex DuplexTumble/Short Edge: "%%FoomaticRipOptionSetting: Duplex=DuplexTumble"
*FoomaticRIPOptionSetting Duplex=DuplexTumble: "SET DUPLEX=ON @PJL SET BINDING=SHORTEDGE"
*End
*Duplex DuplexNoTumble/Long Edge: "%%FoomaticRIPOptionSetting: Duplex=DuplexNoTumble"
*FoomaticRIPOptionSetting Duplex=DuplexNoTumble: "SET DUPLEX=ON @PJL SET BINDING=LONGEDGE"
*CloseUI: *Duplex In the custom printer description file portion of Table 2, the Postscript command for the "Duplex/None/Off" feature/option pair has been replaced with the PJL command, "SET DUPLEX=OFF." The Postscript command for the "Duplex- Tumble/Short Edge" feature/option pair has been replaced with the PJL command, "SET DUPLEX=ON @PJL SET BINDING=SHORTEDGE." The Postscript command for the "DuplexNoTumble/Long Edge" feature/option pair has been replaced with the PJL command, "SET DUPLEX=ON @PJL SET BINDING=LONGEDGE."

In addition, in the custom printer description file portion of Table 2, some "Foomatic" syntax has been added in order to allow a non-Postscript-enabled printer to translate the printer description file. The file generation tool automatically adds this syntax when generating the custom printer description file. "Foomatic" is a PPD extension that is supported by most Linux printing systems. The Foomatic-extended PPD file includes a command line for rendering Postscript into other languages like PCL, and also supports adding PJL commands into the rendered print data stream. By presenting an extended PPD file to a printing system, all printers—Postscript and non-Postscript alike—are viewed as Postscript printers, so long as the printing system supports the PPD extension.

In one embodiment of the invention, the custom printer description file takes the form of a Foomatic-extended PPD file. However, in alternative embodiments of the invention, the custom printer description file may be a PPD file that has been extended using other, non-Foomatic extensions. For example, in one embodiment of the invention, the custom printer description file may be a PPD file that has been extended using the "CUPS" PPD extension.

The non-Postscript commands shown in Table 2 can be understood and processed by a non-Postscript-enabled printer. An example of a technique for automatically generating a custom printer description file is described in greater detail below.

Example Technique

Figure 5:
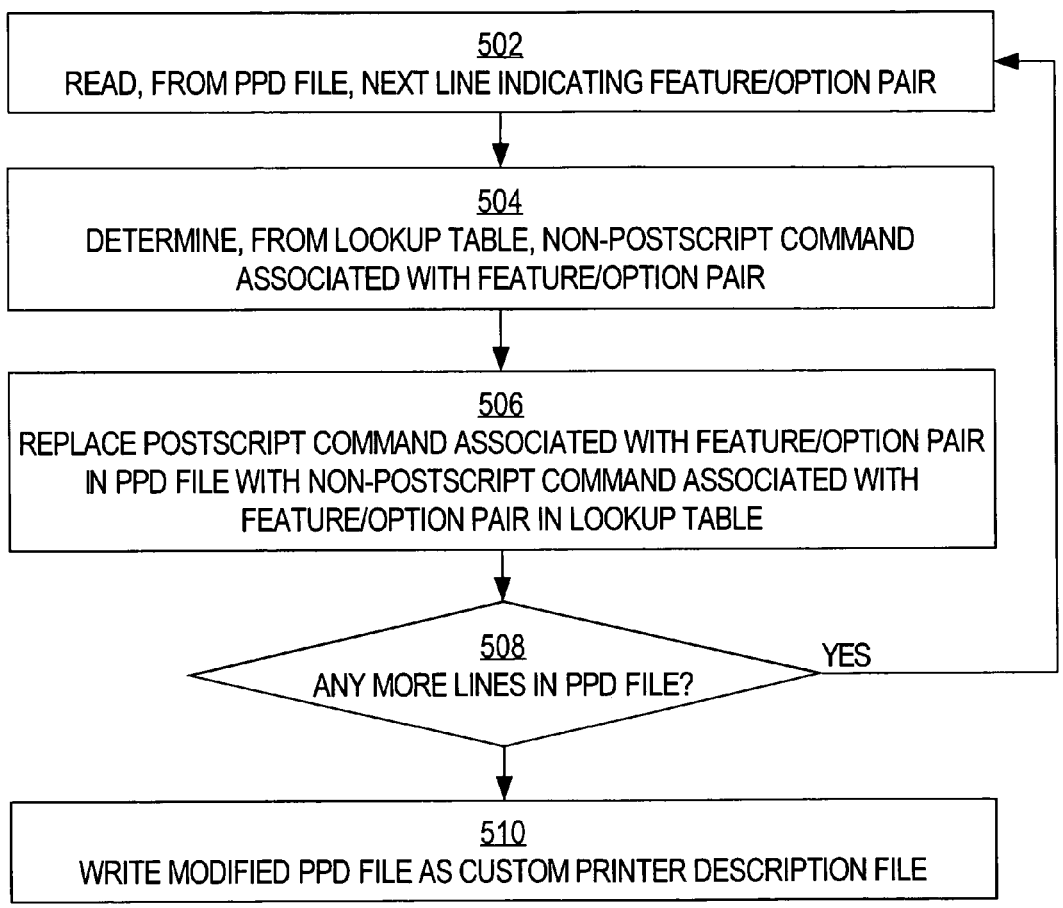
FIG. 5 is a flow diagram that depicts an example of a technique for automatically generating a custom printer description file based on a PPD file and translation data, according to an embodiment of the invention.

FIG. 5 is a flow diagram that depicts an example of a technique for automatically generating a custom printer description file based on a PPD file and translation data, according to an embodiment of the invention. For example, the depicted technique might be performed by file generation tool 302 of FIG. 3.

In block 502, a line indicating a feature/option pair is read from a PPD file for a printing device. For example, file generation tool 302 might read a line from a PPD file that comprises commands such as those shown in Table 1 above. The PPD file indicates the features that the printing device provides, as well as the options that those features can assume. For example, file generation tool 302 might read the line "*Duplex None/Off: '<</Duplex false>>setpagedevice'" from the PPD file. This line corresponds to the "duplex" feature and the associated "none" or "off" option.

In block 504, a non-Postscript command that is associated with the feature/option pair is determined from the lookup table. For example, file generation tool 302 might consult feature list 402 and discover an entry for "duplex," which corresponds to the feature read from the PPD file. File generation tool 302 might then consult option list 404, which is associated with the "duplex" entry, and discover an entry for "off," which corresponds to the option read from the PPD file. File generation tool 302 might then determine that the non-Postscript command associated with the "off" option of the "duplex" feature is "@PJL SET DUPLEX=OFF" according to the lookup table of FIG. 4.

In block 506, the Postscript command that is associated with the feature/option pair in the PPD file is replaced with the non-Postscript command that is associated with the feature/option pair in the lookup table. For example, file generation tool 302 might replace the Postscript command "<</Duplex false>>setpagedevice," as shown in Table 1, with the PJL command "@PJL SET DUPLEX=OFF," as shown in Table 2.

Additionally, file generation tool 302 might insert, into the file, additional commands that are needed to cause the file to conform to the syntax of a PPD extension such as Foomatic. For example, file generation tool 302 might replace the text, "*Duplex None/Off:" as shown in Table 1 with the extended text, "*Duplex None/Off: '%% FoomaticRIPOptionSetting: Duplex=None'*FoomaticRIPOptionSetting Duplex=None:" as shown in Table 2.

In block 508, it is determined whether there are any more lines in the PPD file that have not been read. If there are, then control passes back to block 502, in which the next unread line is read and processed. If there are not, then control passes to block 510.

In block 510, the modified PPD file is written out to persistent storage as the new custom printer description file. The custom printer description file comprises non-Postscript commands that will cause a non-Postscript-enabled printing device to perform the same or similar operations as would have been caused by the Postscript commands that those non-Postscript commands replaced. Based on the custom printer description file, a computer can automatically translate a print data stream containing Postscript commands into a print data stream containing functionally equivalent non-Postscript commands, as shown in FIG. 2.

For example, if an application-generated print data stream contained a Postscript command that instructed a Postscript printer to use a specified duplex setting, then the printing system may consult the custom printer description file to locate a corresponding non-Postscript command that instructs a non-Postscript-enabled printer to use that specified duplex setting, and insert the corresponding non-Postscript command into the print data stream that is sent to the printing device. For another example, if an application-generated print data stream contained a Postscript command that instructed a Postscript printer to deposit a printed document into a specified output tray, then the printing system may consult the custom printer description file to locate a corresponding non-Postscript command that instructs a non-Postscript-enabled printer to deposit the printed document into the specified output tray, and insert the corresponding non-Postscript command into the print data stream that is sent to the printing device. Other examples of Postscript commands and corresponding non-Postscript commands that may be translated in this way include commands for instructing a printing device to (a) apply a staple function to a printed document, (b) apply a punch function to a printed document, (c) print a document in a specified color mode, and (d) print a document in a specified resolution.

Remote Generation

In the embodiments of the invention discussed above, a file generation tool reads a PPD file and translation data and generates a corresponding custom printer description file. In one embodiment of the invention, the file generation tool and the translation data are located on a computer that is separate and remote from the computer whose printing system will be using the automatically generated custom printer description file to insert non-Postscript commands into a print data stream.

Figure 6:
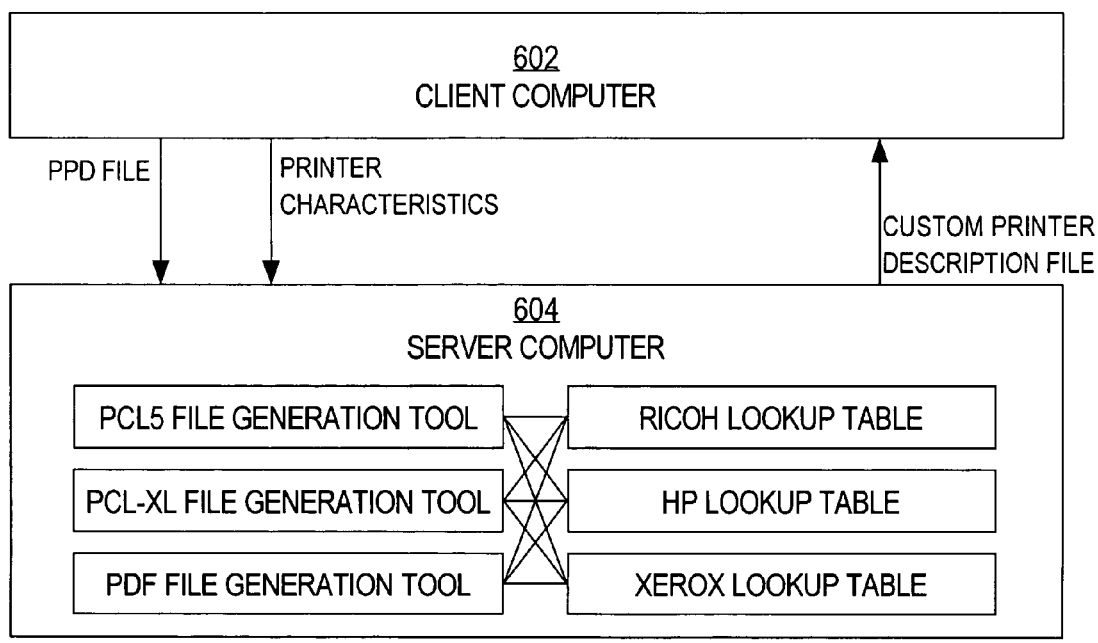
FIG. 6 is a block diagram that depicts an example of a system in which a custom printer description file is generated on a remote computer, according to an embodiment of the invention.

FIG. 6 is a block diagram that depicts an example of a system in which a custom printer description file is generated on a remote computer, according to an embodiment of the invention. In the system of FIG. 6, there is a client computer 602 and a server computer 604. Server computer 604 is located remotely from client computer 602. For example, client computer 602 and server computer 604 may communicate with each other via a computer network, such as a local area network (LAN), a wide area network (WAN), and/or a series of inter-networks such as The Internet.

In one embodiment of the invention, a user of client computer specifies characteristics of the printing device that need to be known in order to generate an appropriate custom printer description file. For example, the characteristics might include (a) an identity of the vendor of the target printing device (e.g., Ricoh, HP, Xerox, etc.), and (b) an identity of the non-Postscript language (e.g., PCL5, PCL-XL, PDF, etc.) that the target printing device is configured to understand.

In one embodiment of the invention, after the user has specified such characteristics, client computer 602 sends the characteristics over a network to server computer 604. Client computer 602 also sends, to server computer 604 over a network, an existing PPD file that corresponds to the target printing device for which the custom printer description file is to be generated. As is discussed above, this PPD file identifies the supported features of the target printing device, as well as the options that such features can assume.

In one embodiment of the invention, server computer 604 receives the characteristics and the PPD file over the network. Based on the characteristics, server computer 604 selects a specific tool to generate the custom printer description file. The selection of the tool may be based on the non-Postscript language identified in the characteristics. For example, if the characteristics indicate that the target printing device understands PCL5 commands, then server computer 604 may select a PCL5 custom printer description file generation tool from among a plurality of different file generation tools resident on server computer 604.

Printing devices from different vendors may implement printer definition languages in different ways. Therefore, in one embodiment of the invention, server computer 604 additionally selects, from among a plurality of lookup tables, a specific lookup table that corresponds to the printing device vendor identified in the characteristics received over the network. For example, if the characteristics indicate that the target printing device is manufactured by Ricoh, then server computer 604 may select a Ricoh lookup table from among a plurality of different lookup tables resident on server computer 604.

In one embodiment of the invention, once server computer 604 has selected an appropriate file generation tool and an appropriate lookup table based on the user-specified characteristics, server computer 604 executes the selected file generation tool. Server computer 604 supplies the selected lookup table and the PPD file as input to the selected file generation tool. Based on the selected lookup table and the PPD file, the selected file generation tool automatically generates a custom printer description file that is appropriate for the target printing device. The selected file generation tool uses techniques described above to automatically generate the custom printer description file.

In one embodiment of the invention, after the selected file generation tool has generated the custom printer description file, server computer 604 sends the custom printer description file, over the same or a different network, to client computer 602. Client computer 602 incorporates the custom printer description file into its printing system, and thereafter uses the custom printer description file to insert non-Postscript commands into print data streams in accordance with user-specified print options.

Implementation Mechanisms

Figure 7:
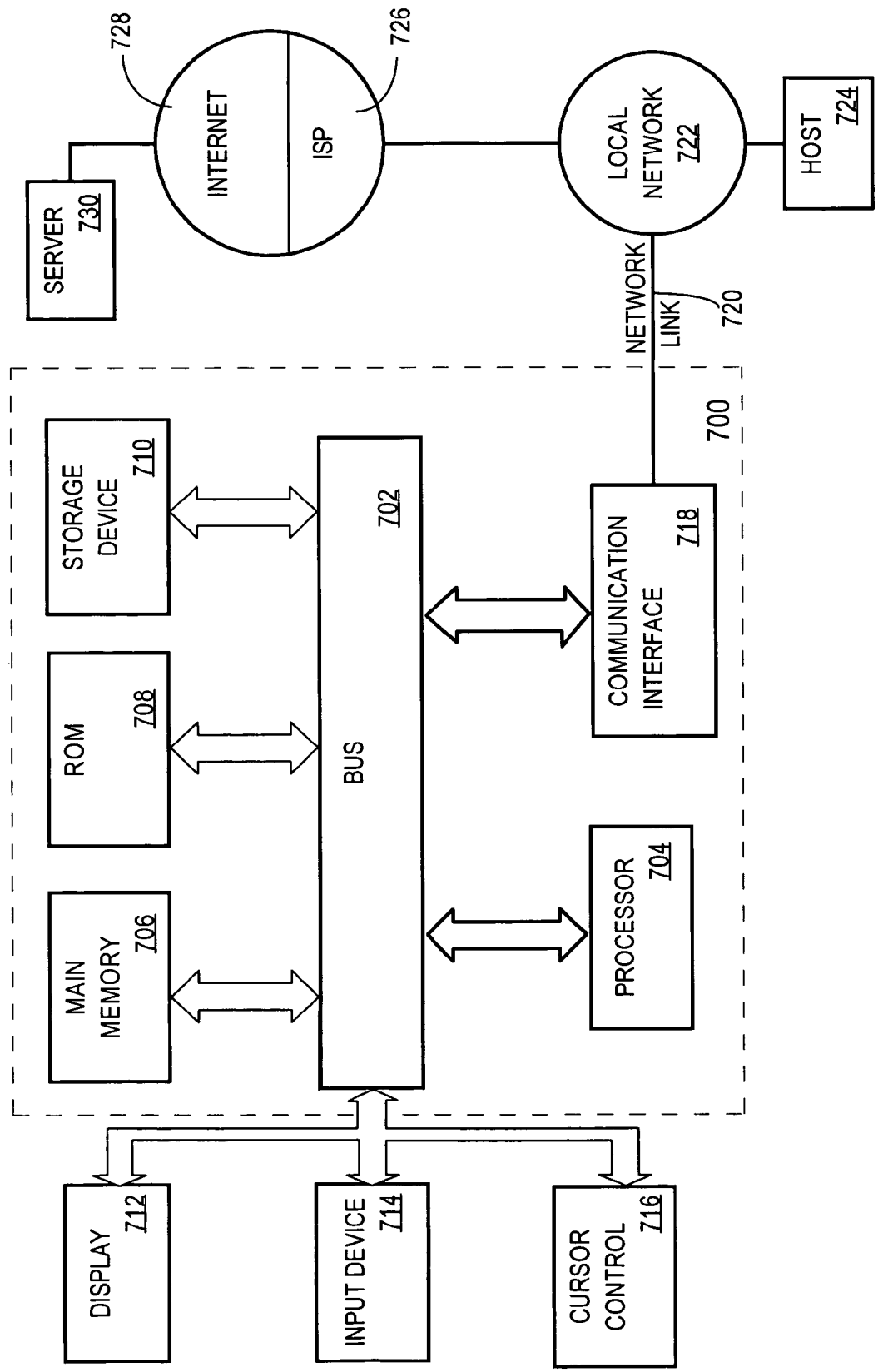
FIG. 7 is a block diagram that depicts a printing device upon which an embodiment of the invention may be implemented.

FIG. 7 is a block diagram that depicts a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), for displaying information to a user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 in a wireless communications architecture. According to one embodiment of the invention, wireless communications are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a LAN card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the Internet 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for configuring a monitoring system to monitor selected network elements as described herein. Processor 704 may execute the received code as it is received and/or stored in storage device 710 or other non-volatile storage for later execution. In this manner, computer system 700 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for generating a custom printer description file, the computer-implemented method comprising:

based on a Postscript Printer Description (PPD) file and translation data, automatically generating the custom printer description file;

wherein a computer can automatically translate, based on the custom printer description file, a first print data stream into a second print data stream;

wherein the first print data stream contains first commands that instruct a Postscript-enabled printing device to perform operations;

wherein the second print data stream contains second non-Postscript commands that instruct a non-Postscript-enabled printing device to perform the operations;

wherein the second commands correspond to the first commands;

wherein the step of automatically generating the custom printer description file comprises generating a Foomatic-extended PPD file;

wherein the steps are performed by one or more computing devices.

2. The computer-implemented method of claim 1, wherein the non-Postscript commands are Printer Command Language (PCL) commands.

3. The computer-implemented method of claim 1, wherein the non-Postscript commands are Printer Job Language (PJL) commands.

4. The computer-implemented method of claim 1, wherein the first commands and the second commands instruct a printing device to print a document using a specified duplex setting.

5. The computer-implemented method of claim 1, wherein the first commands and the second commands instruct a printing device to deposit a printed document into a specified output tray.

6. The computer-implemented method of claim 1, wherein one or more of the first commands cannot be understood by the non-Postscript-enabled printing device.

7. The computer-implemented method of claim 1, wherein the step of automatically generating the custom printer description file comprises:

reading a feature from the Postscript Printer Description file;

reading, from the Postscript Printer Description file, an option that is associated with the feature;

determining a non-Postscript command that is mapped to the option in the translation data;

replacing, with the non-Postscript command, a Postscript command that is associated with the option in the Postscript Printer Description file.

8. The computer-implemented method of claim 1, further comprising:

receiving the Postscript Printer Description file from a client over a network; and sending the custom printer description file to Ward the client over a network.

9. The computer-implemented method of claim 1, wherein the non-Postscript commands are Job Definition Format (JDF) commands.

10. The computer-implemented method of claim 1, wherein the non-Postscript commands are Portable Job Ticket Format (PJTF) commands.

11. The computer-implemented method of claim 2, wherein the non-Postscript commands are Job Control Language (JCL) commands.

12. The computer-implemented method of claim 1, wherein the first commands and the second commands instruct a printing device to print a document using media from a specified input tray.

13. The computer-implemented method of claim 1, wherein the first commands and the second commands instruct a printing device to apply a staple function to a printed document.

14. The computer-implemented method of claim 1, wherein the first commands and the second commands instruct a printing device to apply a punch function to a printed document.

15. The computer-implemented method of claim 1, wherein the first commands and the second commands instruct a printing device to print a document in a specified color mode.

16. The computer-implemented method of claim 1, wherein the first commands and the second commands instruct a printing device to print a document in a specified resolution.

17. A non-transitory computer-readable medium storing instructions for generating a custom printer description file, wherein processing of the instructions by one or more processors causes:
   based on a Postscript Printer Description (PPD) file and translation data, automatically generating the custom printer description file;
   wherein a computer can automatically translate, based on the custom printer description file, a first print data stream into a second print data stream;
   wherein the first print data stream contains first commands that instruct a Postscript-enabled printing device to perform operations;
   wherein the second print data stream contains second non-Postscript commands that instruct a non-Postscript-enabled printing device to perform the operations;
   wherein the second commands correspond to the first commands;
   wherein the step of automatically generating the custom printer description file comprises generating a Foomatic-extended PPD file.

18. The non-transitory computer-readable medium of claim 17, wherein the non-Postscript commands are Printer Command Language (PCL) commands.

19. The non-transitory computer-readable medium of claim 17, wherein the non-Postscript commands are Printer Job Language (PJL) commands.

20. The non-transitory computer-readable medium of claim 17, wherein the first commands and the second commands instruct a printing device to print a document using a specified duplex setting.

21. The non-transitory computer-readable medium of claim 17, wherein the first commands and the second commands instruct a printing device to deposit a printed document into a specified output tray.

22. The non-transitory computer-readable medium of claim 17, wherein one or more of the first commands cannot be understood by the non-Postscript-enabled printing device.

23. The non-transitory computer-readable medium of claim 17, wherein the step of automatically generating the custom printer description file comprises:
   reading a feature from the Postscript Printer Description file;
   reading, from the Postscript Printer Description file, an option that is associated with the feature;
   determining a non-Postscript command that is mapped to the option in the translation data;
   replacing, with the non-Postscript command, a Postscript command that is associated with the option in the Postscript Printer Description file.

24. The non-transitory computer-readable medium of claim 17, wherein the non-Postscript commands are Job Definition Format (JDF) commands.

25. The non-transitory computer-readable medium of claim 17, wherein the non-Postscript commands are Portable Job Ticket Format (PJTF) commands.

26. The non-transitory computer-readable medium of claim 17, wherein the non-Postscript commands are Job Control Language (JCL) commands.

27. The non-transitory computer-readable medium of claim 17, wherein the first commands and the second commands instruct a printing device to print a document using media from a specified input tray.

28. The non-transitory computer-readable medium of claim 17, wherein the first commands and the second commands instruct a printing device to apply a staple function to a printed document.

29. The non-transitory computer-readable medium of claim 17, wherein the first commands and the second commands instruct a printing device to apply a punch function to a printed document.

30. The non-transitory computer-readable medium of claim 17, wherein the first commands and the second commands instruct a printing device to print a document in a specified color mode.

31. The non-transitory computer-readable medium of claim 17, wherein the first commands and the second commands instruct a printing device to print a document in a specified resolution.

* * * * *

UNITED STATES PATENT AND TRADEMARK OFFICE
CERTIFICATE OF CORRECTION

PATENT NO.         : 7,872,765 B2                                                   Page 1 of 1
APPLICATION NO.    : 11/361138
DATED              : January 18, 2011
INVENTOR(S)        : Liu et al.

It is certified that error appears in the above-identified patent and that said Letters Patent is hereby corrected as shown below:

Title Page: Item 75

Please include Hitoshi Sekine, San Mateo, CA (US) as an inventor.

Signed and Sealed this
Seventeenth Day of March, 2015

Michelle K. Lee
*Director of the United States Patent and Trademark Office*